(12) United States Patent
Park et al.

(10) Patent No.: US 9,971,076 B2
(45) Date of Patent: May 15, 2018

(54) QUANTUM DOT COLOR FILTER AND DISPLAY APPARATUS INCLUDING THE SAME

(71) Applicant: Samsung Display Co., Ltd., Yongin-si (KR)

(72) Inventors: Kisoo Park, Yongin-si (KR); Donguk Kim, Yongin-si (KR); Youngmin Kim, Yongin-si (KR); Yongseok Kim, Yongin-si (KR); Haeil Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 189 days.

(21) Appl. No.: 15/156,892

(22) Filed: May 17, 2016

(65) Prior Publication Data
US 2017/0153366 A1   Jun. 1, 2017

(30) Foreign Application Priority Data
Nov. 26, 2015 (KR) .......................... 10-2015-0166404

(51) Int. Cl.
*G02F 1/1335* (2006.01)
*G02B 5/20* (2006.01)

(52) U.S. Cl.
CPC ............ *G02B 5/204* (2013.01); *G02B 5/208* (2013.01); *G02F 1/133504* (2013.01); *G02F 1/133617* (2013.01); *G02F 1/133514* (2013.01); *G02F 2001/133614* (2013.01); *G02F 2001/133624* (2013.01)

(58) Field of Classification Search
CPC ................................................ G02F 1/133617
See application file for complete search history.

(56) References Cited

U.S. PATENT DOCUMENTS

| 8,670,089 B2* | 3/2014 | Hung ................ G02F 1/133617 349/69 |
| 2009/0091689 A1 | 4/2009 | Rho et al. |
| 2012/0287381 A1* | 11/2012 | Li ..................... G02F 1/133617 349/106 |
| 2014/0204319 A1 | 7/2014 | Cai et al. |
| 2016/0055781 A1* | 2/2016 | Phan .................... G09G 3/2003 345/690 |

FOREIGN PATENT DOCUMENTS

| KR | 10-2009-0036373 | 4/2009 |
| KR | 10-2010-0089606 | 8/2010 |
| KR | 10-2012-0048218 | 5/2012 |

* cited by examiner

*Primary Examiner* — Wen-Ying P Chen
(74) *Attorney, Agent, or Firm* — H.C. Park & Associates, PLC (57) ABSTRACT

A quantum dot color filter includes a first pixel region, a second pixel region, a third pixel region, and a fourth pixel region. The first pixel region includes a first color conversion layer including quantum dots configured to convert incident light into light of a first color. The second pixel region includes a second color conversion layer including quantum dots configured to convert incident light into light of the first color, and a third color conversion layer including quantum dots configured to convert incident light into light of a second color. The third pixel region includes a fourth color conversion layer including quantum dots configured to convert incident light into light of the second color. The fourth pixel region includes a scattering material layer.

20 Claims, 10 Drawing Sheets

QUANTUM DOT COLOR FILTER AND DISPLAY APPARATUS INCLUDING THE SAME

CROSS-REFERENCE TO RELATED APPLICATION

This application claims priority from and the benefit of Korean Patent Application No. 10-2015-0166404, filed on Nov. 26, 2015, which is hereby incorporated by reference for all purposes as if fully set forth herein.

BACKGROUND

Field

Exemplary embodiments relate to a quantum dot color filter and a display apparatus including the same.

Discussion of the Background

A liquid crystal display (LCD) apparatus is one type of flat panel display apparatus that is currently widely used. Such LCD displays include two display plates including is electric field generating electrodes, such as a pixel electrode and a common electrode, and a liquid crystal layer between the two display plates. A voltage is applied to the electric field generating electrodes to generate an electric field in the liquid crystal layer, thereby determining an orientation of liquid crystal molecules of the liquid crystal layer and controlling polarization of incident light to display an image.

The liquid crystal display apparatus uses a color filter for color formation, and thus has a low light efficiency since the amount of light emitted from a backlight source is reduced to about one third (⅓) after the light passes through a red color filter, a green color filter, and a blue color filter.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display apparatus having improved color reproducibility and light efficiency.

Additional aspects will be set forth in part in the description which follows and, in part, will be apparent from the description, or may be learned by practice of the presented embodiments.

According to one or more exemplary embodiments, a quantum dot color filter includes a first pixel region, a second pixel region, a third pixel region, and a fourth pixel region. The first pixel region includes a first color conversion layer including quantum dots configured to convert incident light into light of a first color. The second pixel region includes a second color conversion layer including quantum dots configured to convert incident light into light of the first color, and a third color conversion layer including quantum dots configured to convert incident light into light of a second color. The third pixel region includes a fourth color conversion layer including quantum dots configured to convert incident light into light of the second color. The fourth pixel region includes a scattering material layer.

According to one or more exemplary embodiments, a quantum dot color filter includes a first pixel region, a second pixel region, a third pixel region, and a fourth pixel region. The first pixel region includes a first color conversion layer including quantum dots configured to convert incident light into light of a first color. The second pixel region includes a second color conversion layer including quantum dots configured to convert incident light into light of the first color, a third color conversion layer including quantum dots configured to convert incident light into light of a second color, and a fourth color conversion layer including quantum dots configured to convert incident light into light of a third color. The third pixel region includes a fifth color conversion layer including quantum dots configured to convert incident light into light of the second color. The fourth pixel region includes a sixth color conversion layer including quantum dots configured to convert incident light into light of the third color.

According to one or more exemplary embodiments, a display apparatus includes a liquid crystal panel, a backlight device, and a quantum dot color filter. The liquid crystal panel includes a first substrate, a second substrate facing the first substrate, and a liquid crystal layer disposed between the first substrate and the second substrate. The backlight device is configured to provide image forming light to the liquid crystal panel. The quantum dot color filter is configured to form a color by converting a wavelength of light emitted from the backlight device and penetrated through the liquid crystal panel. The quantum dot color filter further includes a first pixel region, a second pixel region, a third pixel region, and a fourth pixel region. The first pixel region includes a first color conversion layer including quantum dots configured to convert incident light into light of a first color. The second pixel region includes a second color conversion layer including quantum dots configured to convert incident light into light of the first color, and a third color conversion layer including quantum dots configured to convert incident light into light of a second color. The third pixel region includes a fourth color conversion layer including quantum dots configured to convert incident light into light of the second color. The fourth pixel region includes a scattering material layer.

According to one or more exemplary embodiments, a display apparatus includes a liquid crystal paned, a backlight device, and a quantum dot color filter. The liquid crystal panel includes a first substrate, a second substrate facing the first substrate, and a liquid crystal layer disposed between the first substrate and the second substrate. The backlight device is configured to provide image forming light to the liquid crystal panel. The quantum dot color filter is configured to form a color by converting a wavelength of light emitted from the backlight device and penetrated through the liquid crystal panel. The quantum dot color filter further includes a first pixel region, a second pixel region, a third pixel region, and a fourth pixel region. The first pixel region includes a first color conversion layer including quantum dots configured to convert incident light into light of a first color. The second pixel region includes a second color conversion layer including quantum dots configured to convert incident light into light of the first color, a third color conversion layer including quantum dots configured to convert incident light into light of a second color, and a fourth color conversion layer including quantum dots configured to convert incident light into light of a third color. The third pixel region includes a fifth color conversion layer including quantum dots configured to convert incident light into light of the second color. The fourth pixel region includes a sixth color conversion layer including quantum dots configured to convert incident light into light of the third color.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element s or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish is one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A photo-luminescent liquid crystal display (PL-LCD) apparatus, useful for high color reproducibility and to compensate for such a low light efficiency, is a liquid crystal display apparatus in which a color filter used in a conventional liquid crystal display apparatus is replaced by a quantum dot color conversion layer (QD-CCL). The PL-LCD apparatus displays a color image using visible light generated when light having a low wavelength band, such as ultraviolet (UV) light or blue light, generated from a light source and controlled by a liquid crystal layer, irradiates a color conversion layer (CCL).

Figure 1:
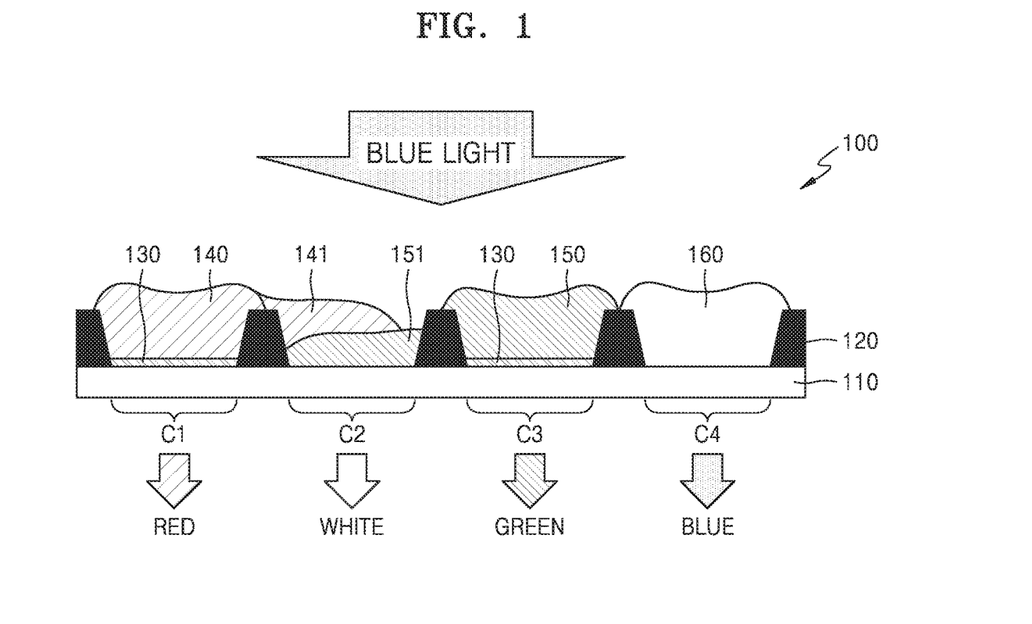
FIG. 1 is a cross-sectional view of a schematic structure of a quantum dot color filter, according to one or more exemplary embodiments.

FIG. 1 is a cross-sectional view of a schematic structure of a quantum dot color filter, according to one or more exemplary embodiments.

A quantum dot color filter 100 includes first pixel region C1, second pixel region C2, third pixel region C3, and fourth pixel region C4 for forming different colors. For example, when blue light is incident on the quantum dot color filter 100, red light, white light, green light, and blue light may be respectively emitted from the first through fourth pixel regions C1 through C4.

The first pixel region C1 includes a first color conversion layer 140 including a plurality of quantum dots configured to convert incident light into light of a first color. The first color conversion layer 140 emits converted incident light after converting the incident light into the converted incident light having a longer wavelength band than that of the incident light. The first color conversion layer 140 may include, for example, quantum dots that absorb blue light and emit red light.

When the blue light is incident on the first pixel region C1, the blue light is converted into red light by the first color conversion layer 140. The first pixel region C1 may further include a band cut filter 130 that blocks the blue light that is not converted by the first color conversion layer 140 so as to avoid such light being emitted from the first pixel region C1.

The second pixel region C2 includes a second color conversion layer 141 including a plurality of quantum dots configured to convert incident light to the first color light, and a third color conversion layer 151 including a plurality of quantum dots configured to convert the incident light to a second color light. The second color conversion layer 141 and the third color conversion layer 151 emit converted incident light after converting the incident light into the converted incident light having a longer wavelength band than that of the incident light. The second color conversion layer 141 may convert, for example, blue light into red light. The third color conversion layer 151 may convert, for example, blue light into green light. Since the second color conversion layer 141 forms the same color as the first color conversion layer 140, the first and second color conversion layers 140 and 141 may be formed of the same material, but is not limited thereto. Manufacturing may be simplified if the first color conversion layer 140 and the second color conversion layer 141 are formed of the same material.

When blue light is incident on the second pixel region C2, some of the blue light is converted into red light by the second color conversion layer 141, and some of the blue light is converted into green light by the third color conversion layer 151. Thus, white light is formed as the red light, the green light, and the blue light are mixed together.

As shown in FIG. 1, the second color conversion layer 141 and the third color conversion layer 151 may be stacked on each other. When the second color conversion layer 141 performs red light conversion and the third color conversion layer 151 performs green light conversion, the second color conversion layer 141, which emits light having a longer wavelength than that of the light emitted from the third color conversion layer 151, may be disposed closer to an incident surface than the third color conversion layer 151. Since the second and third color conversion layers 141 and 151 convert incident light to a light having a wavelength longer than that of the incident light, and thus the red light converted by the second color conversion layer 141 is not converted to green light but is maintained even if the red light is incident on the third color conversion layer 151. The blue light, which is not color converted by the second color conversion layer 141, may be incident on the third color conversion layer 151 and converted into green light, and some of the blue light may be directly incident on the third color conversion layer 151 without passing through the second color conversion layer 141 and converted into green light.

When the second color conversion layer 141 and the third color conversion layer 151 are stacked on each other, they may entirely overlap, but as shown in FIG. 1, they may only partially overlap each other. According to an overlapped range, the amount of the blue light incident directly on the third color conversion layer 151 is adjusted. For example, when the second color conversion layer 141 and the third color conversion layer 151 entirely overlap each other, only the blue light, which in not color converted by the second color conversion layer 141, contributes to color conversion by the third color conversion layer 151. In this case, when efficiency of the color conversion of the second color conversion layer 141 is high, a relatively low amount of blue light is incident on the third color conversion layer 151, and thus the amount of green light that contributes to forming white light may be insufficient. Accordingly, thicknesses and an overlapping range of the second color conversion layer 141 and the third color conversion layer 151 for forming the second pixel region C2 may be determined taking into account the efficiency of each of the second color conversion layer 141 and the third color conversion layer 151 such that white light is easily realized. Also, a color coordinate of white light to be realized may be taken into account.

The third pixel region C3 includes a fourth color conversion layer 150 including a plurality of quantum dots converting incident light into the second color light. Since the fourth color conversion layer 150 forms the same color as the third color conversion layer 151, the third color conversion layer 151 and the fourth color conversion layer 150 may be formed of the same material, but is not limited thereto. A manufacturing process may be simplified if the third conversion layer 151 and the fourth conversion layer 150 are formed of the same material.

When blue light is incident on the third pixel region C3, the blue light is converted into green light by the fourth color conversion layer 150. The third pixel region C3 may further include, for example, the band cut filter 130 that blocks the blue light, which is not converted by the fourth color conversion layer 150, such that it will not be emitted from the third pixel region C3.

The fourth pixel region C4 includes a scattering material layer 160 that scatters incident light. The scattering material layer 160 emits blue light without color conversion, and thus the blue light is emitted from the fourth pixel region C4.

The first through fourth pixel regions C1 through C4, and barrier ribs 120 for defining each pixel region may be formed on a transparent substrate 110.

The quantum dots disposed in the first through fourth color conversion layers 140, 141, 151, and 150 may include one of Si-based nanocrystals, II-VI group-based compound semiconductor nanocrystals, III-V group-based compound semiconductor nanocrystals, IV-VI group-based compound semiconductor nanocrystals, and a combination thereof. The II-VI group-based compound semiconductor nanocrystals may be any one selected from among CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZn-STe, CdHgSeS, CdHgSeTe, CdHgSTe, HgZnSeS, HgZnSeTe, and HgZnSTe. The III-V group-based compound semiconductor nanocrystals may be any one selected from among GaN, GaP, GaAs, AN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. The IV-VI group-based semiconductor nanocrystals may be SbTe.

Even if the quantum dots disposed in the first through fourth color conversion layers 140, 141, 151, and 150 are formed of the same material, a wavelength of light emission is varies depending on the size of the quantum dot. As the size of the quantum dots decrease, the wavelength of emitted light decreases. Thus, by adjusting the size of the quantum dots disposed in the first through fourth color conversion layers 140, 141, 151, and 150, light in a desired visible ray range may be emitted.

When light formed by the first and second color conversion layers 140 and 141 is red light, and light formed by the third and fourth color conversion layers 151 and 150 is green light, the quantum dots disposed in the first through fourth color conversion layers 140, 141, 151, and 150 may be formed of the same material, and the sizes of the quantum dots disposed in the first and second color conversion layers 140 and 141 may be set to be larger than the sizes of the quantum dots disposed in the third and fourth color conversion layers 151 and 150.

The quantum dot color filter 100 realizes white light as the second and third color conversion layers 141 and 151 are stacked on each other in the second pixel region C2. Because a required color coordinate of white light may be obtained by suitably determining the thicknesses and the overlapping range of the second and third color conversion layers 141 and 151, incident light is efficiently used, and thus light efficiency may be high.

Figure 2:
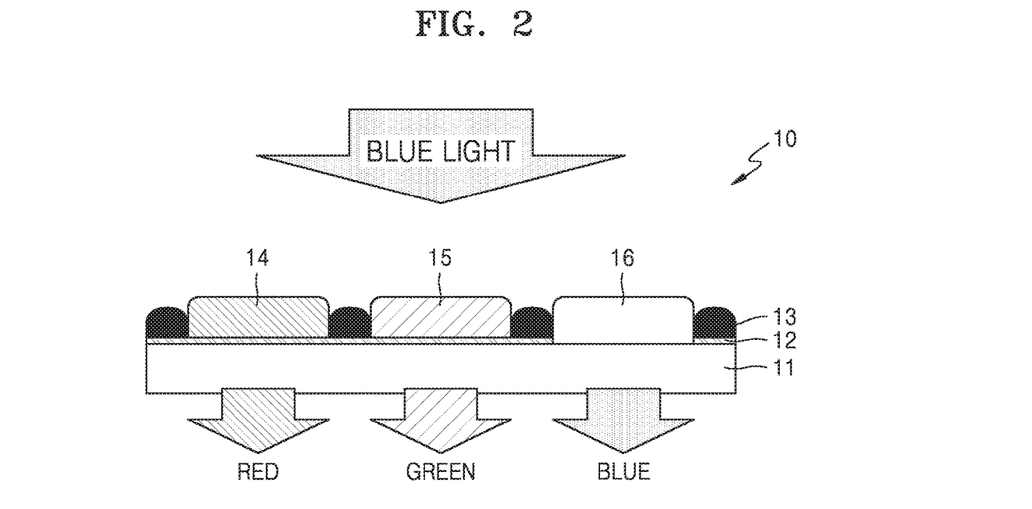
FIG. 2 is a cross-sectional view of a schematic structure of a quantum dot color filter, according to one or more exemplary embodiments.
Figure 3:
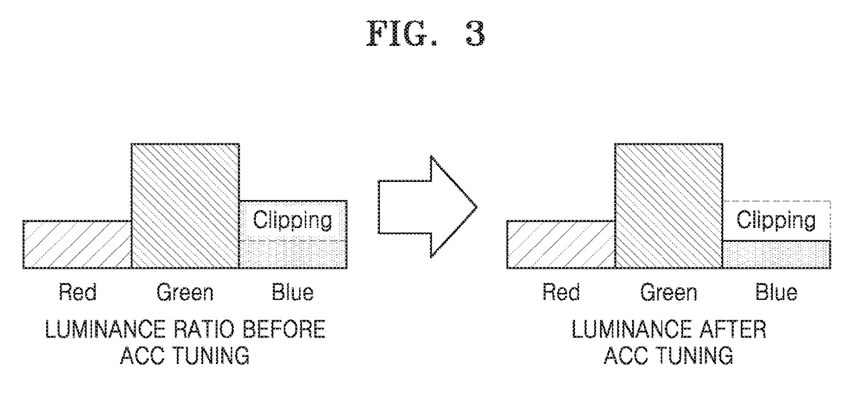
FIG. 3 is a conceptual diagram of optical loss being generated while adjusting a white color coordinate standard using light emitted from the quantum dot color filter of FIG. 2, according to one or more exemplary embodiments.

FIG. 2 is a cross-sectional view of a schematic structure of a quantum dot color filter, and FIG. 3 is a conceptual diagram of optical loss being generated while adjusting a white color coordinate standard using light emitted from the quantum dot color filter of FIG. 2, according to one or more exemplary embodiments.

The quantum dot color filter 10 includes a red quantum dot layer 14, a green quantum dot layer 15, and a scattering material layer 16. Barrier ribs 13 defining each pixel region are disposed on a transparent substrate 11, and the red quantum dot layer 14, the green quantum dot layer 15, and the scattering material layer 16 are disposed in each of the respective is pixel regions. A band cut filter 12 for blocking blue light is provided above the red quantum dot layer 14 and the green quantum dot layer 15 to block any blue light that is not converted into red light and green light.

When blue light is incident on the quantum dot color filter 10, red light, green light, and blue light are emitted respectively through the red quantum dot layer 14, the green quantum dot layer 15, and the scattering material layer 16. In this case, compared to amounts of light emitted through the red quantum dot layer 14 and the green quantum dot layer 15, which are color converted, the amount of light emitted through the scattering material layer 16 that is not color converted may be greater. For example, when white light is to be formed, clipping may be performed on blue light when the amount of the blue light is excessive, as shown in FIG. 3. In other words, since some light is removed during accurate color capture (ACC) tuning, luminance is decreased by ACC tuning, and thus light efficiency may be decreased.

In the quantum dot color filter 100 of FIG. 1, white forming pixel may include a stacked structure of two color conversion layers, thereby increasing usage efficiency of incident light and forming white light of a desired color coordinate.

In the quantum dot color filter 10 of FIG. 2, the band cut filter 12 may be provided in two of three pixel regions, whereas in the quantum dot color filter 100 of FIG. 1, the band cut filter 130 is provided in two of four pixel regions. Thus, a decrease in light efficiency by the band cut filter is reduced in the quantum dot color filter 10 of FIG. 2 in comparison to the quantum dot color filter 100 of FIG. 1.

FIGS. 4A, 4B, 4C, and 4D are conceptual diagrams for describing a method of manufacturing a quantum dot color filter, according to one or more exemplary embodiments.

A photolithography process using photoresist containing quantum dots may be is used to manufacture the quantum dot color filter.

Figure 4A:
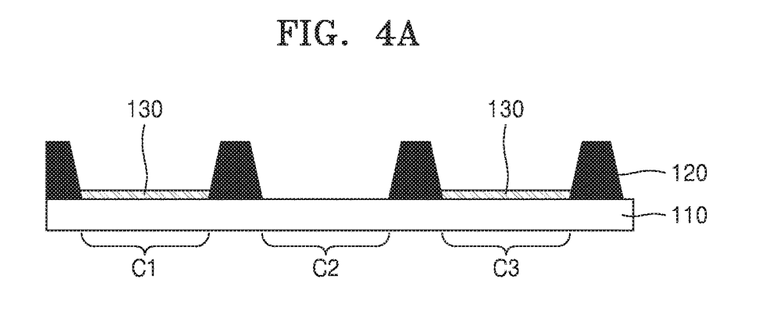
FIGS. 4A through 4D are conceptual diagrams for describing a method of manufacturing a quantum dot color filter, according to one or more exemplary embodiments.

Referring to FIG. 4A, the transparent substrate 110 including the barrier ribs 120 defining each pixel region is prepared. The band cut filter 130, which blocks light that is not color converted from being emitted, may be further provided in the first and third pixel regions C1 and C3, in which a single color conversion layer is to be formed.

Figure 4B:
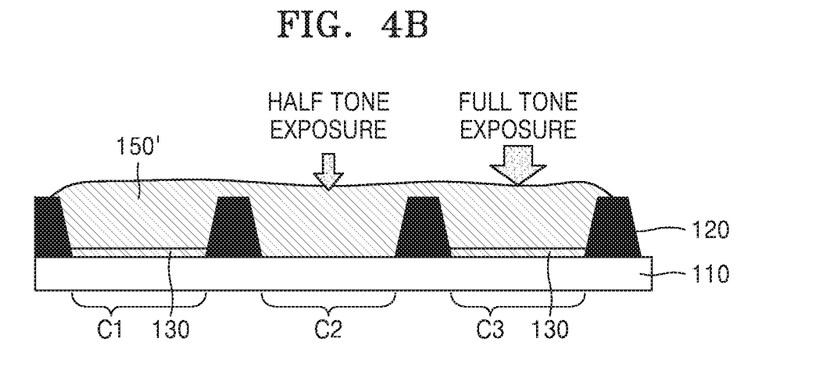

Referring to FIG. 4B, a quantum dot-photoresist 150', in which quantum dots converting incident light into light of a second color are distributed, is coated entirely over the transparent substrate 110. The second pixel region C2 is exposed to lower light energy than a light energy exposed to the third pixel region C3 such that a quantum dot layer is formed throughout the second and third pixel regions C2 and C3, and that the quantum dot-photoresist 150' is patterned to be thinner in the second pixel region C2 than in the third pixel region C3. Light is not irradiated on the first pixel region C1, in which a quantum dot layer is not formed. Such an exposure pattern is formed assuming that the quantum dot-photoresist 150' is a negative photoresist, and the exposure pattern may be reversed when the quantum dot-photoresist 150' is a positive photoresist. In order to adjust exposure energy, light energy irradiated on the second pixel region C2 may be different than that on the third pixel region C3, or the amount of light reaching the second pixel region C2 may be reduced by irradiating light on the second pixel region C2 using a mask having a plurality of slits.

Figure 4C:
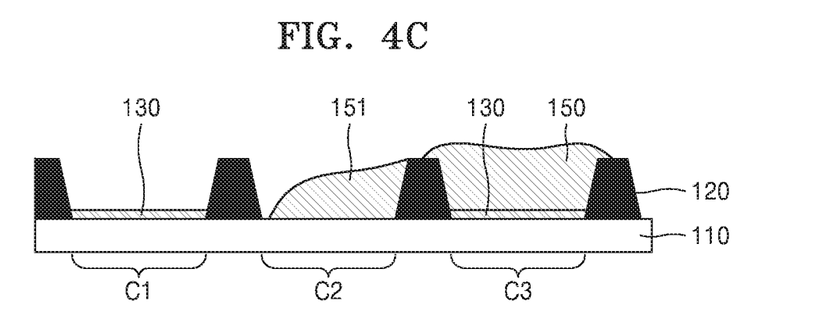

Referring to FIG. 4C, the third color conversion layer 151 of the second pixel region C2 and the fourth color conversion layer 150 of the third pixel region C3 are formed by a development process after an exposure process of FIG. 4B.

Figure 4D:
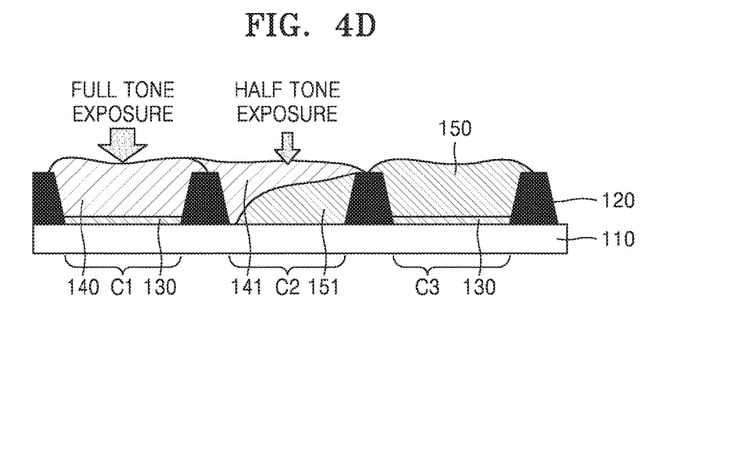

Referring to FIG. 4D, the first color conversion layer 140 is formed in the first pixel region C1 and the second color conversion layer 141 is formed over the third color conversion layer 151 of the second pixel region C2 using a quantum dot-photoresist, in which quantum dots converting incident light into light of a first color are distributed, and by a photolithography process adjusting exposure energy according to pixel regions. As such, the quantum dot color filter 100 including a plurality of color conversion layers, such as a stacked structure of the second color conversion layer 141 and the third color conversion layer 151, in the second pixel region C2 may be manufactured. The manufacturing process in the second pixel region has been mainly described, and a fourth pixel region, in which a quantum dot layer is not formed, is not shown.

The method uses a photoresist process of using a quantum dot photoresist, which is used, for example, to manufacture the quantum dot color filter 10 of FIG. 2. However, additionally in the method, only the exposure energy is adjusted according to pixel regions, and thus, the quantum dot color filter 100 may be easily manufactured by using general processes.

Figure 5:
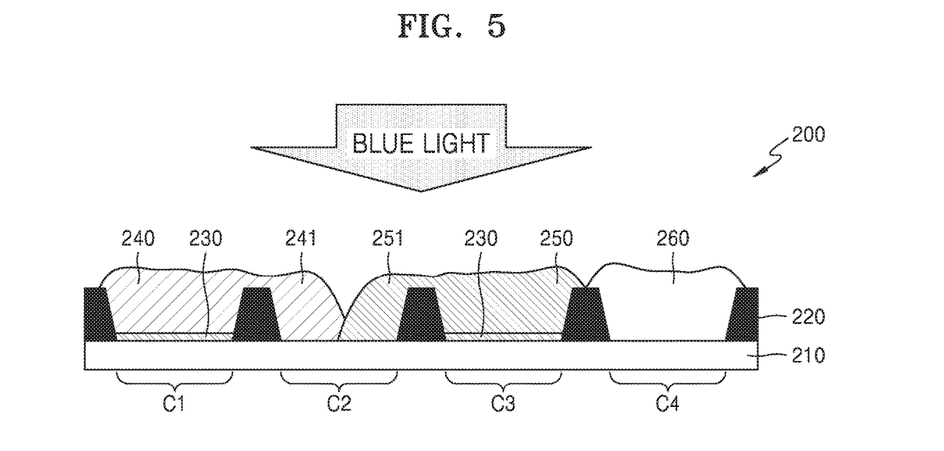
FIG. 5 is a cross-sectional view of a schematic structure of a quantum dot color filter, according to one or more exemplary embodiments.

FIG. 5 is a cross-sectional view of a schematic structure of a quantum dot color filter, according to one or more exemplary embodiments.

The quantum dot color filter 200 includes the first through fourth pixel regions C1 through C4 for forming different colors. The first through fourth pixel regions C1 through C4 are divided by barrier ribs 220 disposed on a transparent substrate 210.

The first pixel region C1 includes a first color conversion layer 240 including a plurality of quantum dots converting incident light into light of a first color. For example, the first color conversion layer 240 may absorb blue light and emit red light. The first pixel region C1 may further include a band cut filter 230 blocking blue light, on which color conversion is not performed by the first color conversion layer 240, from being emitted from the first pixel region C1.

The second pixel region C2 includes a second color conversion layer 241 including a plurality of quantum dots converting incident light into light of the first color, and a third color conversion layer 251 including a plurality of quantum dots converting incident light into light of a second color. The second color conversion layer 241 may convert blue light into red light. The third color conversion layer 251 may convert blue light into green light. The second color conversion layer 241 and the third color conversion layer 251 are disposed horizontally in the second pixel region C2.

The third pixel region C3 includes a fourth color conversion layer 250 including a plurality of quantum dots converting incident light into light of a second color. The third pixel region C3 may further include the band cut filter 230 blocking blue light, on which color conversion is not performed by the fourth color conversion layer 250, from being emitted from the third pixel region C3.

The fourth pixel region C4 includes a scattering material layer 260 scattering incident light.

The quantum dot color filter 200 may be different from the quantum dot color filter 100 of FIG. 1 in that the second color conversion layer 241 and the third color conversion layer 251 are disposed horizontally in the second pixel region C2. Even when the second color conversion layer 241 and the third color conversion layer 251 are disposed horizontally, a user views mixed light in a horizontal direction within a certain distance, and thus white light may be formed in the second pixel region C2. As described above with reference to FIG. 1, widths of the second and third color conversion layers 241 and 251 in a horizontal direction disposed in the second pixel region C2 may be determined by taking into account a color coordinate of white light to be realized in the second pixel region C2 and efficiency of color conversion of the second and third color conversion layers 241 and 251.

Figure 6:
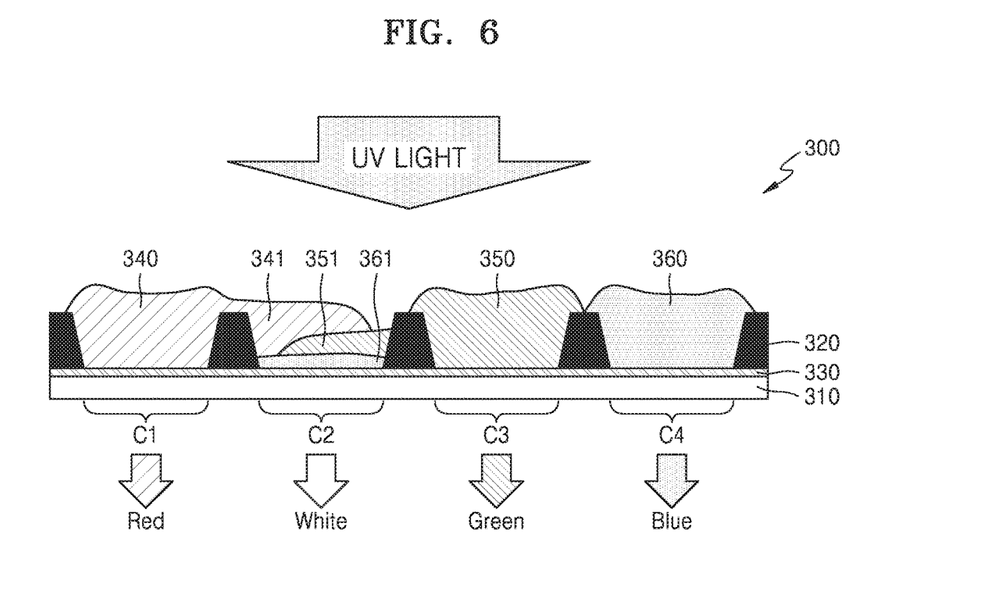
FIG. 6 is a cross-sectional view of a schematic structure of a quantum dot color filter, according to one or more exemplary embodiments.

FIG. 6 is a cross-sectional view of a schematic structure of a quantum dot color filter, according to one or more exemplary embodiments.

The quantum dot color filter 300 includes the first through fourth pixel regions C1 through C4 for forming different colors. The first through fourth pixel regions C1 through C4 are divided by barrier ribs 320 disposed on a transparent substrate 310.

The first pixel region C1 includes a first color conversion layer 340 including a plurality of quantum dots converting incident light into light of a first color. The first color conversion layer 340 may convert ultraviolet (UV) light into red light.

The second pixel region C2 includes a second color conversion layer 341 including a plurality of quantum dots converting incident light into light of the first color, a third color conversion layer 351 including a plurality of quantum dots converting incident light into light of a second color, and a fourth color conversion layer 361 including a plurality of quantum dots converting incident light into light of a third color. The second through fourth color conversion layers 341, 351, and 361 are stacked in the second pixel region C2. At least two of the second through fourth color conversion layers 341, 351, and 361 may partially overlap one another.

The second color conversion layer 341 may convert, for example, UV light into red light. The third color conversion layer 351 may convert, for example, UV light into green light. The fourth color conversion layer 361 may convert, for example, UV light into blue light.

When UV light is incident on the second pixel region C2, some of the UV light is converted into red light by the second color conversion layer 341, some of the UV light is converted into green light by the third color conversion layer 351, and some of the UV light is converted into blue light by the fourth color conversion layer 361, and thus white light is formed as the red light, green light, and blue light are mixed together.

The second color conversion layer 341, the third color conversion layer 351, and the fourth color conversion layer 361 may be stacked on one another as shown in FIG. 6. When the second color conversion layer 341 performs red light conversion, the third color conversion layer 351 performs green light conversion, and the fourth color conversion layer 361 performs blue light conversion, the second through fourth color conversion layers 341 through 361 may be arranged in an order of decreasing wavelength of emitted light, from an incident surface. Since the second through fourth color conversion layers 341 through 361 are layers that emit light having a longer wavelength than a wavelength of incident light, incident light, which is converted into red light by the second color conversion layer 341, is not converted into green or blue light but is maintained as red light even if it is incident on the third or fourth color conversion layers 351 or 361. UV light, on which color conversion is not performed by the second color conversion layer 341, may be incident on the third color conversion layer 351 and converted into green light, and the green light is not converted into blue light even if it is incident on the fourth color conversion layer 361. UV light, on which color conversion is not performed by the second and third color conversion layers 341 and 351, is incident on the fourth color conversion layer 361 and is converted into blue light.

When the second through fourth color conversion layers 341 through 361 are stacked on one another, they may entirely overlap, but as shown in FIG. 6, at least two of the second through fourth color conversion layers 341 through 361 may partially overlap one another. The amount of UV light directly incident on the third color conversion layer 351 is adjusted according to an overlapping range. For example, when the second and third color conversion layers 341 and 351 entirely overlap each other, only UV light, on which color conversion is not performed by the second color conversion layer 341, contributes to color conversion by the third color conversion layer 351. In this case, when the efficiency of color conversion of the second color conversion layer 341 is high, a relatively low amount of UV light is incident on the third color conversion layer 351, and thus the amount of green light that contributes to forming white light may be insufficient. Also, since only UV light, on which color conversion is not performed by the second and third color conversion layers 341 and 351, contributes to forming blue light in the fourth color conversion layer 361, if the second and third color conversion layers 341 and 351 entirely overlap the fourth color conversion layer 361, the amount of UV light incident on the fourth color conversion layer 361 is low, and thus the amount of blue light that contributes to forming white light may be insufficient.

Accordingly, thicknesses and overlapping ranges of the second through fourth color conversion layers 341 through 361 may be determined taking into account a color coordinate of white light to be formed in the second pixel region C2 and efficiency of color conversion of the second through fourth color conversion layers 341 through 361.

The third pixel region C3 includes a fifth color conversion layer 350 including a plurality of quantum dots converting incident light into the second color light. The fifth color conversion layer 350 may convert, for example, UV light into green light.

The fourth pixel region C4 includes a sixth color conversion layer 360 including a plurality of quantum dots converting incident light into the third color light. The sixth color conversion layer 360 may convert, for example, UV light into blue light.

A band cut filter 330 that blocks UV light, on which color conversion is not performed, from being emitted from the first through fourth pixel regions C1 through C4 may be provided over the first through fourth pixel regions C1 through C4.

Figure 7:
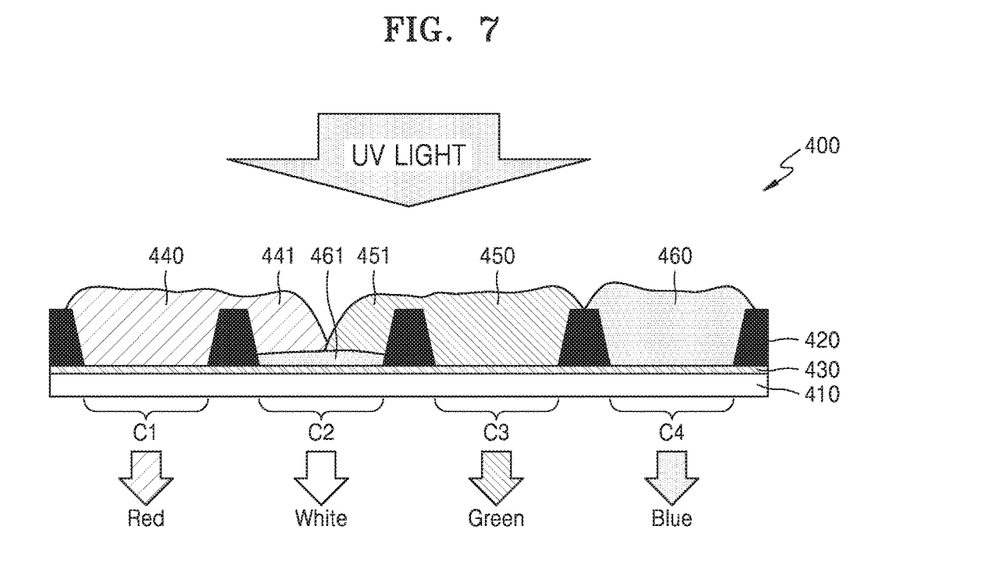
FIG. 7 is a cross-sectional view of a schematic structure of a quantum dot color filter, according to one or more exemplary embodiments.

FIG. 7 is a cross-sectional view of a schematic structure of a quantum dot color filter, according to one or more exemplary embodiments.

The quantum dot color filter 400 includes the first through fourth pixel regions C1 through C4 for forming different colors. The first through fourth pixel regions C1 through C4 are divided by barrier ribs 420 formed over a transparent substrate 410.

The first pixel region C1 includes a first color conversion layer 440 including a plurality of quantum dots converting incident light into first color light. The first color conversion layer 440 may convert UV light into red light.

The second pixel region C2 includes a second color conversion layer 441 including a plurality of quantum dots converting incident light into the first color light, a third color conversion layer 451 including a plurality of quantum dots converting incident light into second color light, and a fourth color conversion layer 461 including a plurality of quantum dots s converting incident light into third color light. The second color conversion layer 441 may convert, for example, UV light into red light. The third color conversion layer 451 may convert, for example, UV light into green light. The fourth color conversion layer 461 may convert, for example, UV light into blue light. The second and third color conversion layers 441 and 451 are disposed horizontally above the fourth color conversion layer 461.

The third pixel region C3 includes a fifth color conversion layer 450 including a plurality of quantum dots converting incident light into the second color light. The fifth color conversion layer 450 may convert, for example, UV light into green light.

The fourth pixel region C4 includes a sixth color conversion layer 460 including a plurality of quantum dots converting incident light into the third color light. The sixth color is conversion layer 460 may convert, for example, UV light into blue light.

A band cut filter 430 blocking UV light, on which color conversion is not performed, from being emitted from the first through fourth pixel regions C1 through C4 may be further provided over the first through fourth pixel regions C1 through C4.

The quantum dot color filter 400 of FIG. 7 is different from the quantum dot color filter 300 of FIG. 6 in that the second and third color conversion layers 441 and 451 are disposed horizontally over the fourth color conversion layer 461 in the second pixel region C2. Even when the second and third color conversion layers 441 and 451 are horizontally provided, a person views mixed light in a horizontal direction within a certain distance, and thus white light may be formed in the second pixel region C2. A thickness of the fourth color conversion layer 461 formed in the second pixel region C2 or widths of the second and third color conversion layers 441 and 451 in a horizontal direction may be determined taking into account a color coordinate of white light to be realized in the second pixel region C2 and efficiency of color conversion of the second, third, and fourth color conversion layers 441, 451, and 461.

Figure 8:
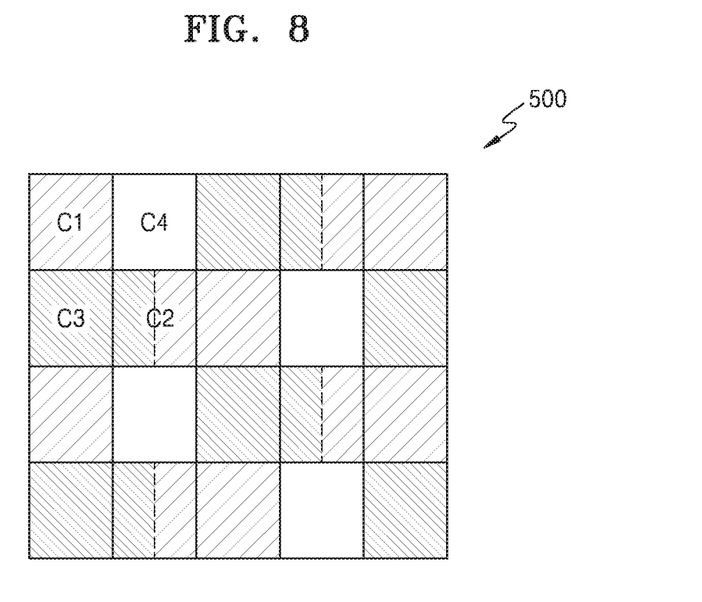
FIG. 8 is a plan view of a pixel arrangement of a quantum dot color filter, according to one or more exemplary embodiments.

FIG. 8 is a plan view of a pixel arrangement of a quantum dot color filter, according to one or more exemplary embodiments.

The quantum dot color filter 500 includes the first through fourth pixel regions C1 through C4 for forming different colors.

As described above with reference to FIGS. 1 and 5, the first pixel region C1 converts incident light into the first color light, for example, may absorb blue light and emit red light. The second pixel region C2 includes a region converting incident light into the first color light and a region converting incident light into the second color light. For example, the second pixel region C2 includes a region converting blue light into red light and a region converting blue is light into green light, and realizes white light in overall. The third pixel region C3 converts incident light into the second color light, for example, may convert blue light into green light. The fourth pixel region C4 scatters and emits incident light without color conversion.

Regions performing different color conversions are shown in different hatchings in FIG. 8, and the second pixel region C2 is shown as if two color conversion regions are horizontally arranged, but an embodiment is not limited thereto, and a stacked structure of the two color conversion regions of FIG. 1 may be used.

The first through fourth pixel regions C1 through C4 are respectively arranged on four quadrants and repeatedly, and have an area ratio of 1:1:1:1.

Figure 9:
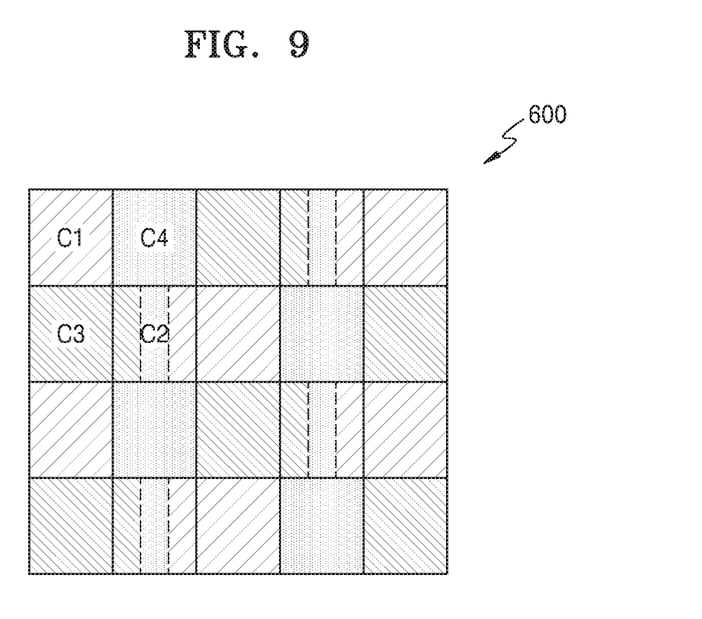
FIG. 9 is a plan view of a pixel arrangement of a quantum dot color filter, according to one or more exemplary embodiments.

FIG. 9 is a plan view of a pixel arrangement of a quantum dot color filter, according to one or more exemplary embodiments.

The quantum dot color filter 600 includes the first through fourth pixel regions C1 through C4 for forming different colors.

As described above with reference to FIGS. 6 and 7, the first pixel region C1 converts incident light into the first color light, and for example, may absorb UV light and emit red light. The second pixel region C2 includes a region converting incident light into the first color light, a region converting incident light into the second color light, and a region converting incident light into the third color light. For example, the second pixel region C2 includes a region converting UV light into red light, a region converting UV light into green light, and a region converting UV light into blue light, and realizes white light in overall. The third pixel region C3 converts incident light into the second color light, and for example, may convert UV light into green light. The fourth pixel region C4 converts incident light into the third color light, and for example, may convert UV light into blue light.

Regions performing different color conversions are shown in different hatchings in FIG. 9, and the second pixel region C2 is shown as if three color conversion regions are horizontally arranged, but an embodiment is not limited thereto, and a stacked structure of the three color conversion regions of FIGS. 6 and 7 may be used.

The first through fourth pixel regions C1 through C4 are respectively arranged on four quadrants and repeatedly, and have an area ratio of 1:1:1:1.

Figure 10:
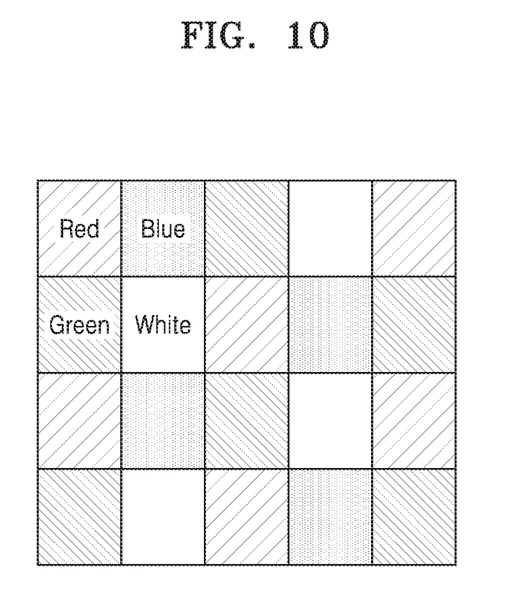
FIG. 10 is a plan view of a color arrangement realized when blue light is incident on the quantum dot color filter of FIG. 8 or when ultraviolet (UV) light is incident on the quantum dot color filter of FIG. 9, according to one or more exemplary embodiments.

FIG. 10 is a plan view of a color arrangement realized when blue light is incident on the quantum dot color filter of FIG. 8 or when UV light is incident on the quantum dot color filter of FIG. 9, according to one or more exemplary embodiments.

An area ratio of red, green, blue, and white is 1:1:1:1 according to the pixel arrangements of FIGS. 8 and 9.

Figure 11:
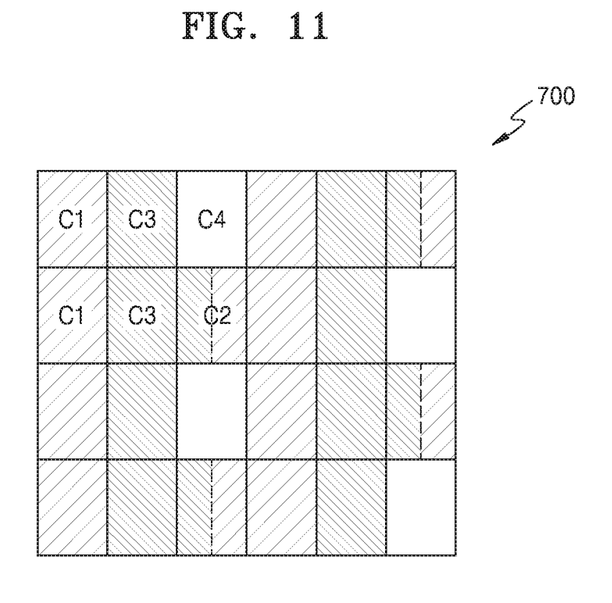
FIG. 11 is a plan view of a pixel arrangement of a quantum dot color filter, according to one or more exemplary embodiments.

FIG. 11 is a plan view of a pixel arrangement of a quantum dot color filter, according to one or more exemplary embodiments.

A quantum dot color filter 700 includes the first through fourth pixel regions C1 through C4 for forming different colors. The first through fourth pixel regions C1 through C4 of FIG. 11 are same as the first through fourth pixel regions C1 through C4 of FIG. 8, only except for their arrangements and an area ratio. Here, the area ratio of the first through fourth pixel regions C1, C2, C3, and C4 is 2:1:2:1.

Figure 12:
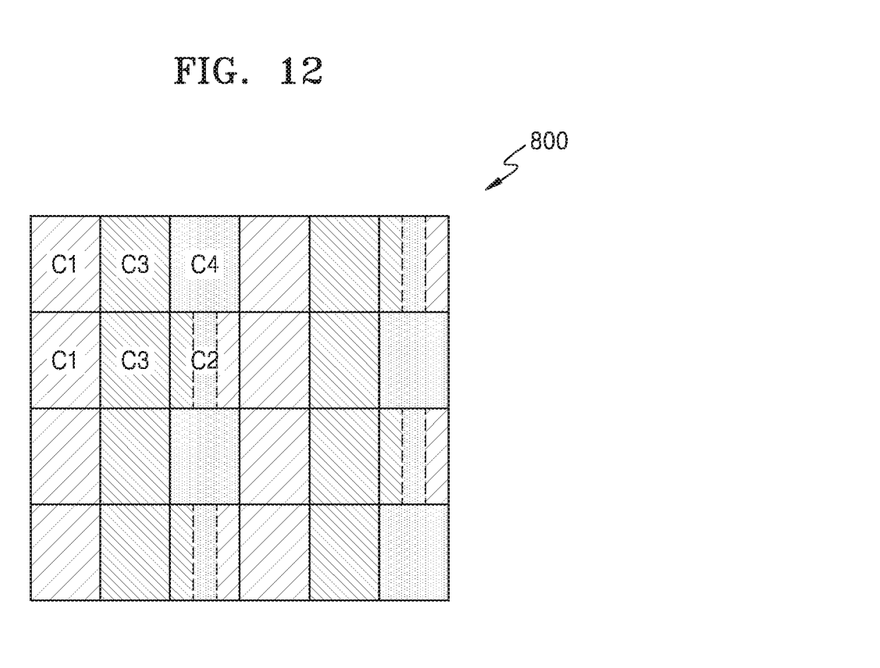
FIG. 12 is a plan view of a pixel arrangement of a quantum dot color filter, according to one or more exemplary embodiments.

FIG. 12 is a plan view of a pixel arrangement of a quantum dot color filter, according to one or more exemplary embodiments.

A quantum dot color filter 800 includes the first through fourth pixel regions C1 through C4 for forming different colors. The first through fourth pixel regions C1 through C4 of FIG. 12 are same as the first through fourth pixel regions C1 through C4 of FIG. 9, only except for their arrangements and an area ratio. Here, the area ratio of the first through fourth pixel regions C1, C2, C3, and C4 is 2:1:2:1.

Figure 13:
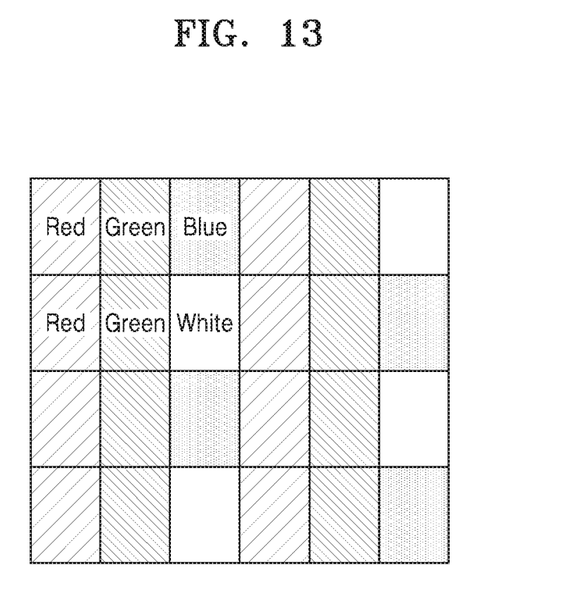
FIG. 13 is a plan view of a color arrangement realized when blue light is incident on the quantum dot color filter of FIG. 11 or when UV light is incident on the quantum dot color filter of FIG. 12, according to one or more exemplary embodiments.

FIG. 13 is a plan view of a color arrangement realized when blue light is incident on the quantum dot color filter of FIG. 11 or when UV light is incident on the quantum dot color filter of FIG. 12, according to one or more exemplary embodiments.

An area ratio of red, green, blue, and white is 2:1:2:1 according to pixel arrangements of FIGS. 11 and 12.

With reference to FIGS. 8 through 13, two examples of an area ratio of red, green, blue, and white are described, but embodiments are not limited thereto, and an area ratio may be suitably determined taking into account the efficiency and luminance of colors to be realized.

Figure 14:
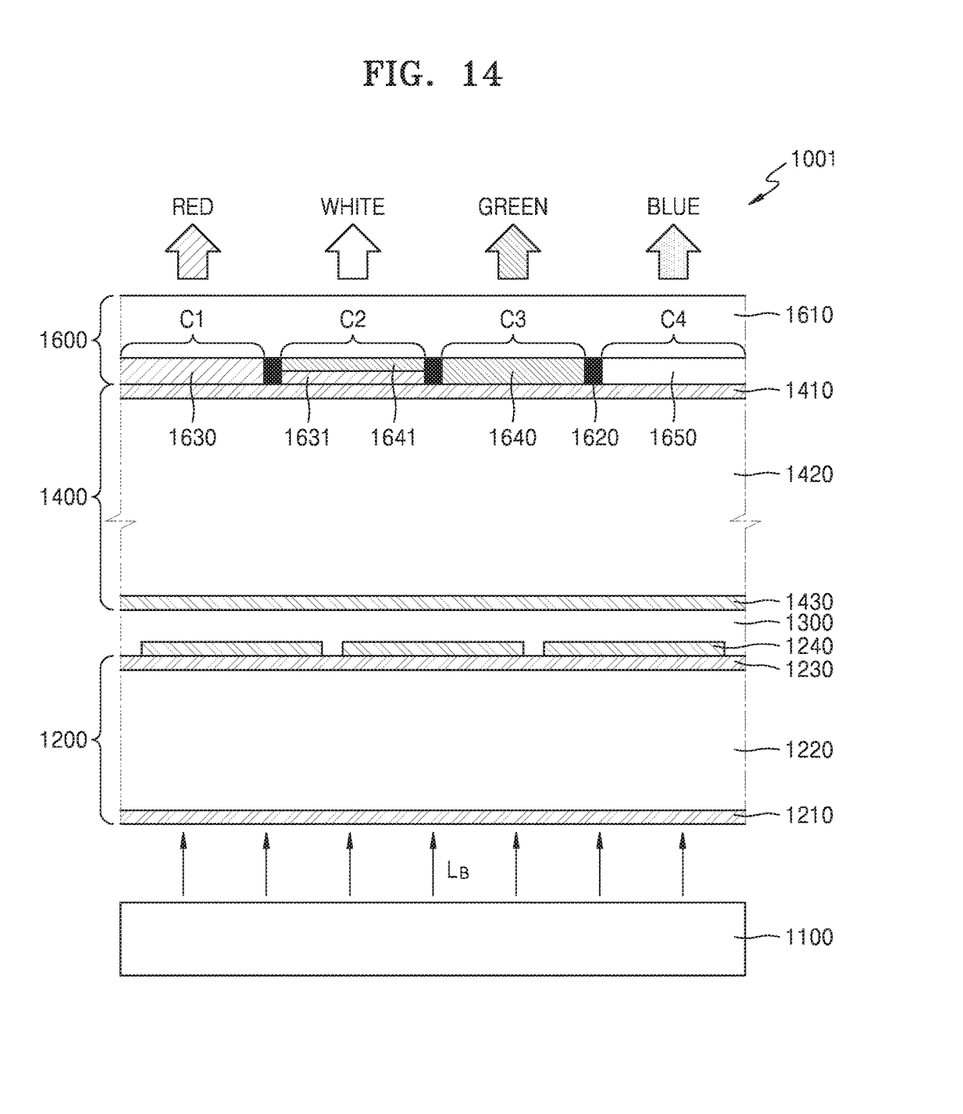
FIG. 14 is a cross-sectional view of a schematic structure of a display apparatus, according to one or more exemplary embodiments.

FIG. 14 is a cross-sectional view of a schematic structure of a display apparatus, according to one or more exemplary embodiments.

The display apparatus 1001 includes: a liquid crystal panel including a lower substrate 1200 and an upper substrate 1400, which face each other, and a liquid crystal layer 1300 disposed between the lower substrate 1200 and the upper substrate 1400; a backlight device 1100 providing image forming light to the liquid crystal panel; and a quantum dot color filter 1600 forming a color by converting a wavelength of light emitted from the backlight device 1100 and penetrated through the liquid crystal panel.

The backlight device 1100 includes a light source emitting blue light $L_B$, and thus may provide the blue light $L_B$ to the liquid crystal panel.

The lower substrate 1200 includes a first substrate 1220, a lower polarizing plate 1210 formed on a lower surface of the first substrate 1220, and a pixel electrode 1240 formed over an upper surface of the first substrate 1220. Also, a thin-film transistor (TFT) array layer is 1230 including a plurality of transistors (not shown) for respectively controlling regions of the liquid crystal layer 1300 corresponding to a plurality of pixels may be disposed between the first substrate 1220 and the pixel electrode 1240.

The first substrate 1220 may be formed of glass or a transparent plastic material.

The lower polarizing plate 1210 disposed on the lower surface of the first substrate 1220 is used for penetrating only light of certain polarization. For example, the lower polarizing plate 1210 may only penetrate light of linear polarization in a first direction.

The TFT array layer 1230 may include the plurality of transistors, and a gate wire and a data wire for respectively applying a gate signal and a data signal to the plurality of transistors.

The pixel electrode 1240 receives a data voltage by being connected to a drain electrode of the transistor of the TFT array layer 1230.

The upper substrate 1400 includes a second substrate 1420, an upper polarizing plate 1410 formed on an upper surface of the second substrate 1420, and a common electrode 1430 formed on a lower surface of the second substrate 1420.

The upper polarizing plate 1410 may be a polarizing plate penetrating light of linear polarization in a second direction that is perpendicular to the first direction. However, an embodiment is not limited thereto, and the lower polarizing plate 1210 and the upper polarizing plate 1410 may be configured to penetrate light of the same polarization.

The liquid crystal layer 1300 is disposed between the upper substrate 1400 and the lower substrate 1200, and an arrangement of liquid crystal molecules included in the liquid crystal layer 1300 is adjusted according to a voltage applied between the common electrode 1430 and the pixel electrode 1240. In other words, the regions of the liquid crystal layer 1300 between the common electrode 1430 and the pixel electrode 1240 are controlled according to the voltage applied between the common electrode 1430 and the pixel electrode 1240, and thus the liquid crystal layer 1300 is either in an on-mode for changing polarization of incident light or in an off-mode for not changing polarization of incident light. Also, a degree of changing polarization of incident light may be adjusted to express an intermediate gray scale.

The quantum dot color filter 1600 includes a transparent substrate 1610, the first through fourth pixel regions C1 through C4 for forming different colors, and barrier ribs 1620 defining each pixel region.

As described above with reference to FIGS. 1, 5, 8, and 11, the first through fourth pixel regions C1 through C4 are configured to realize red light, white light, green light, and blue light. The first pixel region C1 includes a first color conversion layer 1630 converting the blue light $L_B$ into red light, the second pixel region C2 includes a second color conversion layer 1631 converting the blue light $L_B$ into red light and a third color conversion layer 1641 converting the blue light $L_B$ into green light, the third pixel region C3 includes a fourth color conversion layer 1640 converting the blue light $L_B$ into green light, and the fourth pixel region C4 includes a scattering material layer 1650. The second and third color conversion layers 1631 and 1641 are stacked on each other in the second pixel region C2, but an embodiment is not limited thereto, and the second and third color conversion layers 1631 and 1641 may be disposed to horizontally or may only partially overlap each other.

Although not illustrated in FIG. 14, a band cut filter blocking the blue light $L_B$, which is not converted into red light and green light, from being emitted may be further disposed over the first pixel region C1 and the third pixel region C3.

The blue light $L_B$ from the backlight device 1100 penetrates through the liquid is crystal panel, and the liquid crystal layer 1300 is turned on or off according to pixel regions based on image information to be incident on the quantum dot color filter 1600, thereby being converted into red light, green light, blue light, and white light to display an image.

Figure 15:
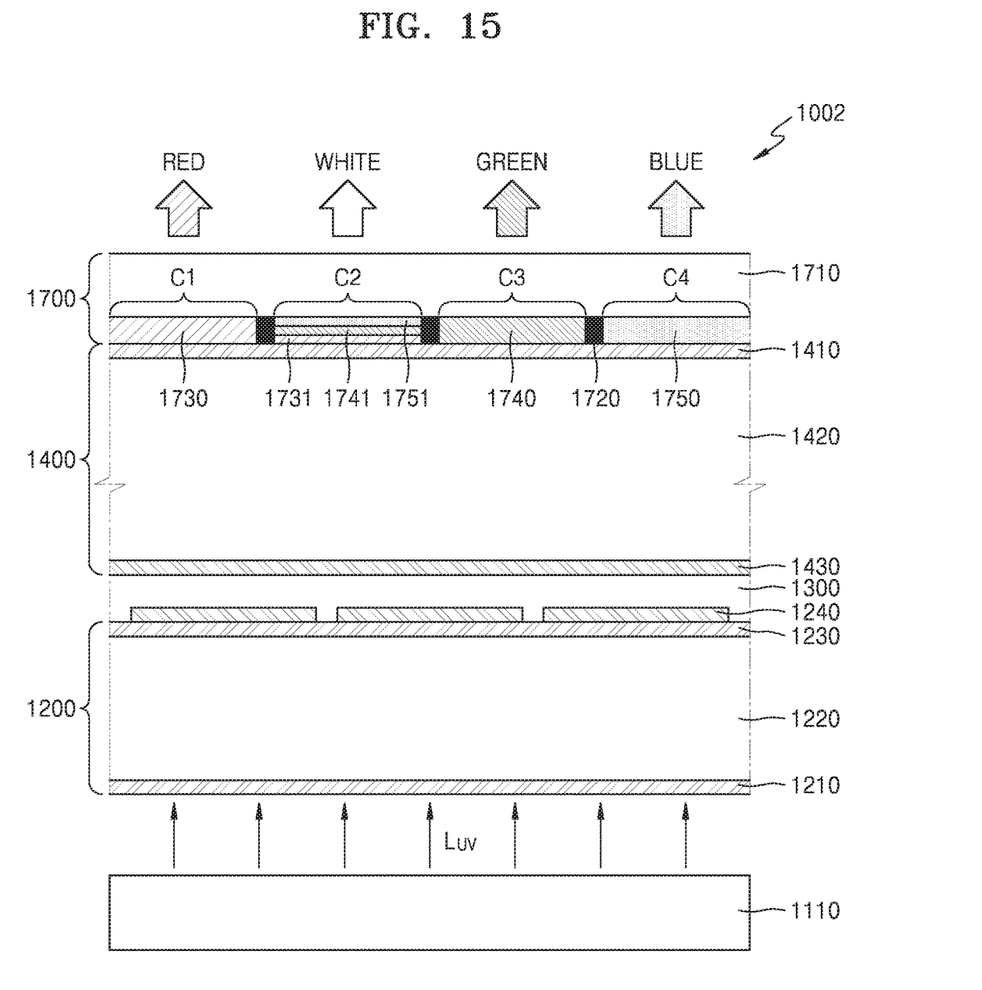
FIG. 15 is a cross-sectional view of a schematic structure of a display apparatus, according to one or more exemplary embodiments.

FIG. 15 is a cross-sectional view of a schematic structure of a display apparatus, according to one or more exemplary embodiments.

The display apparatus 1002 includes: a liquid crystal panel including a lower substrate 1200 and a upper substrate 1400, which face each other, and a liquid crystal layer 1300 disposed between the lower and upper substrates 1200 and 1400; a backlight device 1110 providing image forming light to the liquid crystal panel; and a quantum dot color filter 1700 forming a color by converting a wavelength of light emitted from the backlight device 1110 and penetrated through the liquid crystal panel.

The display apparatus 1002 of FIG. 15 is different from the display apparatus 1001 of FIG. 14 with respect to structures of the backlight device 1110 and the quantum dot color filter 1700.

The backlight device 1110 is configured to emit UV light $L_{UV}$.

The quantum dot color filter 1700 includes a transparent substrate 1710, the first through fourth pixel regions C1 through C4 for forming different colors, and barrier ribs 1720 defining each pixel region. As described above with reference to FIGS. 6, 7, 9, and 12, the first through fourth pixel regions C1 through C4 are configured to realize red light, white light, green light, and blue light. The first pixel region C1 includes a first color conversion layer 1730 converting the UV light $L_{UV}$ into red light, the second pixel region C2 includes a second color conversion layer 1731 converting the UV light $L_{UV}$ into red light, a third color conversion layer 1741 converting the UV light $L_{UV}$ into green light, and a fourth color conversion layer 1751 is converting the UV light $L_{UV}$ into green light, the third pixel region C3 includes a fifth color conversion layer 1740 converting the UV light $L_{UV}$ into green light, and the fourth pixel region C4 includes a sixth color conversion layer 1750 converting the UV light $L_{UV}$ into green light. The second through fourth color conversion layers 1731 through 1751 are stacked on one another in the second pixel region C2, but an embodiment is not limited thereto, and the second through fourth color conversion layers 1731 through 1751 may be disposed horizontally, only partially overlap one another, or disposed horizontally and stacked on one another at the same time.

Although not illustrated in FIG. 15, a band cut filter blocking the UV light $L_{UV}$ from being emitted may be further disposed over the first pixel region C1 and the third pixel region C3.

The UV light $L_{UV}$ from the backlight device 1110 penetrates through the liquid crystal panel, and the liquid crystal layer 1300 is turned on or off according to pixel regions based on image information to be incident on the quantum dot color filter 1700, thereby being converted into red light, green light, blue light, and white light to display an image.

According to one or more exemplary embodiments, a quantum dot color filter includes a white pixel including a plurality of quantum dot layers, and may realize a desired white by adjusting arrangements of the quantum dot layers, and thus light efficiency may be high. For example, color clipping may be minimized during ACC tuning. A display apparatus including the quantum dot color filter may have high light efficiency and may realize an image having a wide viewing angle.

Although certain exemplary embodiments and implementations have been described herein, other embodiments and modifications will be apparent from this description. Accordingly, the inventive concept is not limited to such embodiments, but rather to the broader is scope of the presented claims and various obvious modifications and equivalent arrangements.

What is claimed is:

1. A quantum dot color filter comprising:
   a first pixel region comprising a first color conversion layer comprising quantum dots configured to convert incident light into light of a first color;
   a second pixel region comprising a second color conversion layer comprising quantum dots configured to convert incident light into light of the first color, and a third color conversion layer comprising quantum dots configured to convert incident light into light of a second color;
   a third pixel region comprising a fourth color conversion layer comprising quantum dots configured to convert incident light into light of the second color; and
   a fourth pixel region comprising a scattering material layer.

2. The quantum dot color filter of claim 1, wherein the second color conversion layer and the third color conversion layer are stacked on each other in the second pixel region.

3. The quantum dot color filter of claim 2, wherein the second color conversion layer and the third color conversion layer are stacked to partially overlap each other.

4. The quantum dot color filter of claim 1, wherein the second color conversion layer and the third color conversion layer are disposed horizontally in the second pixel region.

5. A quantum dot color filter comprising:
a first pixel region comprising a first color conversion layer comprising quantum dots configured to convert incident light into light of a first color;
a second pixel region comprising a second color conversion layer comprising quantum dots configured to convert incident light into light of the first color, a third color conversion layer comprising quantum dots configured to convert incident light into light of a second color, and a fourth color conversion layer comprising quantum dots configured to convert incident light into light of a third color;
a third pixel region comprising a fifth color conversion layer comprising quantum dots configured to convert incident light into light of the second color; and
a fourth pixel region comprising a sixth color conversion layer comprising quantum dots configured to convert incident light into light of the third color.

6. The quantum dot color filter of claim 5, wherein the second color conversion layer, the third color conversion layer, and the fourth color conversion layer are stacked on one another in the second pixel region.

7. The quantum dot color filter of claim 6, wherein at least two of the second color conversion layer, the third color conversion layer, and the fourth color conversion layer are stacked to partially overlap one another.

8. The quantum dot color filter of claim 5, wherein two of the second color conversion layer, the third color conversion layer, and the fourth color conversion layer are disposed horizontally on the remaining layer.

9. A display apparatus comprising:
a liquid crystal panel comprising a first substrate, a second substrate facing the first substrate, and a liquid crystal layer disposed between the first substrate and the second substrate;
a backlight device configured to provide image forming light to the liquid crystal panel; and
a quantum dot color filter configured to form a color by converting a wavelength of light emitted from the backlight device and penetrated through the liquid crystal panel,
wherein the quantum dot color filter comprises:
a first pixel region comprising a first color conversion layer comprising quantum dots configured to convert incident light into light of a first color;
a second pixel region comprising a second color conversion layer comprising quantum dots configured to convert incident light into light of the first color, and a third color conversion layer comprising quantum dots configured to convert incident light into light of a second color;
a third pixel region comprising a fourth color conversion layer comprising quantum dots configured to convert incident light into light of the second color; and
a fourth pixel region comprising a scattering material layer.

10. The display apparatus of claim 9, wherein the backlight device is configured to provide blue light to the liquid crystal panel.

11. The display apparatus of claim 10, further comprising a band cut filter configured to block blue light that is not color converted in the first color conversion layer and the fourth color conversion layer from being emitted from the first region and the third pixel region, and disposed in the first pixel region and the third pixel region of the quantum dot color filter.

12. The display apparatus of claim 9, wherein the second color conversion layer and the third color conversion layer are stacked on each other in the second pixel region.

13. The display apparatus of claim 9, wherein the second color conversion layer and the third color conversion layer are stacked to partially overlap each other.

14. The display apparatus of claim 9, wherein the second color conversion layer and the third color conversion layer are disposed horizontally in the second pixel region.

15. The display apparatus of claim 9, wherein the first color conversion layer and the second color conversion layer are formed of the same material.

16. The display apparatus of claim 9, wherein the third color conversion layer and the fourth color conversion layer are formed of the same material.

17. A display apparatus comprising:
a liquid crystal panel comprising a first substrate, a second substrate facing the first substrate, and a liquid crystal layer disposed between the first substrate and the second substrate;
a backlight device configured to provide image forming light to the liquid crystal panel; and
a quantum dot color filter configured to form a color by converting a wavelength of light emitted from the backlight device and penetrated through the liquid crystal panel,
wherein the quantum dot color filter comprises:
a first pixel region comprising a first color conversion layer comprising quantum dots configured to convert incident light into light of a first color;
a second pixel region comprising a second color conversion layer comprising quantum dots configured to convert incident light into light of the first color, a third color conversion layer comprising quantum dots configured to convert incident light into light of a second color, and a fourth color conversion layer comprising quantum dots configured to convert incident light into light of a third color;
a third pixel region comprising a fifth color conversion layer comprising quantum dots configured to convert incident light into light of the second color; and
a fourth pixel region comprising a sixth color conversion layer comprising quantum dots configured to convert incident light into light of the third color.

18. The display apparatus of claim 17, wherein the backlight device is configured to provide ultraviolet (UV) light to the liquid crystal panel.

19. The display apparatus of claim 18, wherein the quantum dot color filter further comprises a band cut filter configured to block UV light which is not color converted from being emitted from the first pixel region, the second pixel region, the third pixel region, and the fourth pixel region.

20. The display apparatus of claim 18, wherein at least two of the second color conversion layer, the third color conversion layer, and the fourth color conversion layer are stacked on one another in the second pixel region.

* * * * *